United States Patent [19]

Ying

[11] 4,150,429
[45] Apr. 17, 1979

[54] TEXT EDITING AND DISPLAY SYSTEM HAVING A MULTIPLEXER CIRCUIT INTERCONNECTING PLURAL VISUAL DISPLAYS

[75] Inventor: Charles W. Ying, Andover, Mass.
[73] Assignee: Atex, Incorporated, Bedford, Mass.
[21] Appl. No.: 710,220
[22] Filed: Jul. 30, 1976

Related U.S. Application Data

[63] Continuation of Ser. No. 508,358, Sep. 23, 1974, abandoned.

[51] Int. Cl.² .......................... G06F 3/04; G06F 3/14
[52] U.S. Cl. .................................................. 364/200
[58] Field of Search ........................ 364/200 MS File

[56] References Cited

U.S. PATENT DOCUMENTS

| | | | |
|---|---|---|---|
| 3,447,135 | 5/1969 | Calta et al. .......................... | 364/200 |
| 3,543,244 | 11/1970 | Cuccio ................................ | 364/200 |
| 3,648,252 | 3/1972 | Thron et al. ........................ | 364/200 |
| 3,710,324 | 1/1973 | Cohen ................................. | 364/200 |
| 3,833,930 | 9/1974 | Macker .............................. | 364/200 |

*Primary Examiner*—Harvey E. Springborn
*Attorney, Agent, or Firm*—Cesari & McKenna

[57] ABSTRACT

A text-editing system includes a central processor unit, a bus connected to the central processor unit and input terminals connected to the bus for entering text and editing commands into the system. Text is displayed by the system on visual display apparatuses that are associated with each input terminal based upon information that is stored in display memories. A multiplexer circuit connects plural visual display apparatuses to the bus and a display memory and routes address and data signals between the display memory and either the bus or selected ones of the visual display apparatuses.

5 Claims, 3 Drawing Figures

TEXT EDITING AND DISPLAY SYSTEM HAVING A MULTIPLEXER CIRCUIT INTERCONNECTING PLURAL VISUAL DISPLAYS

This is a continuation of application Ser. No. 508,358 filed Sept. 23, 1974 now abandoned.

BACKGROUND OF THE INVENTION

A. Field of the Invention

This invention relates to electronic text editing and display systems using a common bus, and comprises apparatus for establishing data transfers between memory and display units independently of the common bus, while retaining communication between these devices and the common bus when desired.

B. Prior Art

An electronic text editing and display system typically includes data input units for entering textual data to be displayed and edited; data display units for displaying the text; one or more memory units for storing the data to be displayed; an "editor" for correcting or modifying the data being displayed; and an output device that receives the edited text. Typically the display devices comprise cathode ray tubes (CRT's). These are limited persistence devices which require the repeated application of display data to maintain the display, and thus require frequent and masssive data transfers from memory.

In one common type of system the memory and editor are incorporated within the data input device itself, as is the display device, to thereby form a self-contained "active" or "intelligent" terminal. These are quite expensive and thus their use is restricted to installations of substantial size which handle large amounts of data to be edited.

Another type of system uses a general purpose digital computer to interconnect one or more input devices with one or more output devices. The necessary data manipulation and control ("editing") functions are performed by the central processor, thereby enabling use of "passive" display devices which are quite inexpensive. In one form of such a system, all data transfers between the input devices and memory, or between memory and the display devices, take place through the system central processor. The latter constitutes an extensive burden on the central processor, and is especially wasteful in text editing and display systems which incorporate limited persistence display devices such as cathode ray tubes because of the necessity for frequent large scale data transfers between memory and the output display units for purposes of refreshing the display. Since such data transfers occupy a substantial portion of the central processor's available time, the number of display units which can be connected into the system is quite limited. These drawbacks can be partly alleviated by associating a captive memory with each display for display-refresh purposes, but this complicates the editing process and susbstantially increases the required memory capacity.

Some of the disadvantages of the foregoing system are avoided through use of an arrangement in which a common bus system connects the central processor, the memories, and all other units such as input/output units and display units. All data transfers between any of the units of the system, including the central processor, take place over this bus. One example of a common bus arrangement, commonly known as the "Unibus" TM system, is described in detail in U.S. Pat. No. 3,710,324. Briefly summarizing the salient features of that device, the common bus has a number of lines over which address, data and control information is transferred between the devices connected to the bus. All devices, including the central processor, memory, and the peripheral devices, use the same set of signals to communicate with each other; this is achieved in part by providing each device with a similar set of one or more control and status registers, as well as data registers, which utilize the common signal set for communication over the bus.

Each of the registers is directly addressable in the same manner as a memory location, and thus normal memory reference instructions can control all data transfers to and from the various devices; that is, the central processor can treat all other devices connected to the common bus as active memory locations and address them as such. This is a distinct improvement over the intra-system data transfer arrangements, but the number of display devices that can be connected to the bus without causing significant display degradation due to delays in obtaining bus access is quite limited, since only two devices at a time can communicate with each other over the bus.

Memory units having two access ports have heretofore been interposed between the common bus and the display units to thereby remove some of the data transfers in the system from the common bus. However, in such systems, data transfers from memory to memory, such as are often desired to enable a supervisor to monitor editing operations at the various display devices, pass through the central processor and thus burden it.

Accordingly, it is an object of the invention to provide an improved text editing and display system.

Further, it is an object of the invention to provide an improved text editing and display system which can accommodate a substantial number of displays without deterioration of the display quality.

Further, it is an object of the invention to provide a text editing and display system incorporating a central processor which allows efficient use of the processor for text editing operations while accommodating a substantial number of displays.

Another object of the invention is to provide a text editing and display system which facilitates memory-to-display data transfers.

Still a further object of the invention is to provide an improved device interconnection arrangement within a digital computer system utilizing a common bus to connect system components, including a central processor and peripheral devices.

SUMMARY

In the present invention, I store the data to be displayed and edited in one or more random access (e.g. magnetic core) memory units, each of which is of sufficient size to accommodate the display data for one or more display units. The memory units as well as the display units, are addressable from the common bus; thus data transfers involving a memory unit can take place over the common bus without involving the central processor. Further, I isolate data transfers between each memory unit and its associated display unit from the common bus by interposing a multiplexer between the common bus, on the one hand, and the memory and display units on the other. When either the memory unit or the display unit is to communicate with the central processor unit or other devices, the multiplexer connects the memory unit or the display unit, as the case may be, to the common bus and data transfer takes place over the bus. Thus, the memory data may be updated from an input terminal or from a device such as a disk memory unit connected to the common bus, or editing operations may be performed on it by the central processor.

On the other hand, data transfers from the memory unit to its associated display unit pass through the multiplexer directly from the memory to the display unit independently of the common bus. This frees the bus for use by other devices during this data transfer, and thus overcomes the most significant limitation of the common bus in multiple-terminal text editing systems, that is, its inability to accommodate simultaneous data transfers among various units in the system.

Isolating the data display units and their associated memory units from the common bus in this manner significantly increases the number of display devices that can be connected to the common bus, since most of the data transfers occur off the common bus. Thus, the bus is freed for other data transfers. Specifically, it gives the processor faster access to the bus for data transfers with other memories not directly involved in display-refresh data transfers at a given time, so the processor spends less time waiting for the bus to be made available with a consequent increase in its efficiency. However, the flexibility of the common bus arrangement for transfers directly between peripheral, or "master," units and the memory units without involvement of the central processor is still preserved, and thus operations at any of the display units may be monitored remotely at a supervisor's station, also connected to the bus, without waiting for central processor servicing.

This invention is pointed out with particularity in the appended claims.

The foregoing and other objects and features of the invention will be more readily understood by referring to the following detailed description taken in conjunction with the accompanying drawings.

BRIEF DESCRIPTION OF THE DRAWINGS

FIG. 3 is a circuit diagram of the transfer control circuit of FIG. 2.

DESCRIPTION OF THE PREFERRED EMBODIMENT

Figure 1:
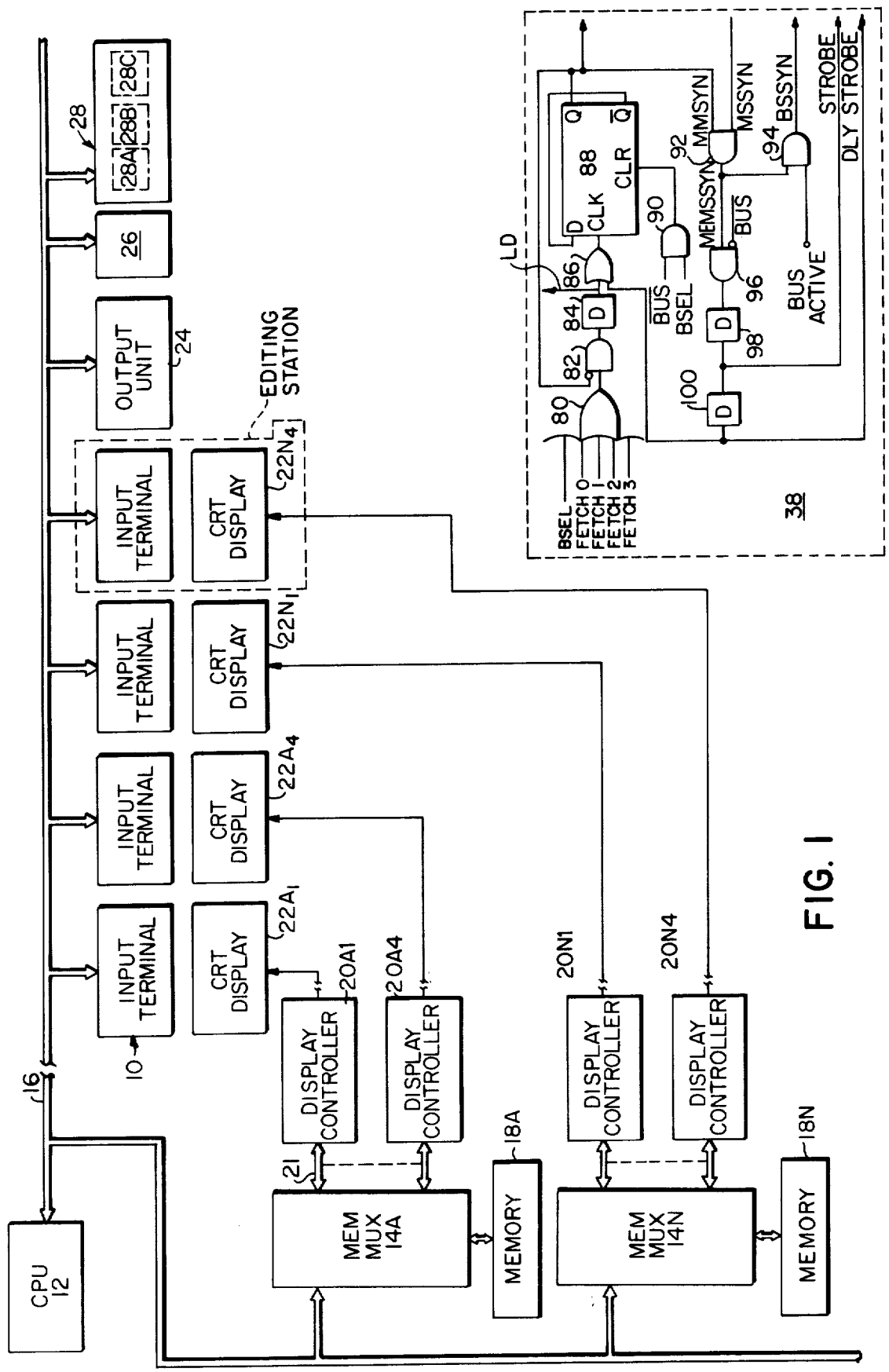
FIG. 1 is a block diagram of a text editing and display controller in accordance with the present invention.

As shown in FIG. 1, the text editing system of the present invention is formed from a number of input terminals 10, a central processor unit (CPU) 12, and a number of multiplexers, such as multiplexers 14A and 14N, all of which are connected to a common bus 16. In the following discussion, I use the reference numeral "14" generally to designate the multiplexers and the reference numerals "14A" or "14N" to refer to a specific multiplexer. This same convention is used in conjunction with later references to other elements that occur multiply in the drawings. Each multiplexer 14 has associated with it a corresponding one of memories 18A . . . 18N and a number of display controllers such as controllers 20A1 through 20A4 connected to multiplexer 14A and controllers 20N1 through 20N4 connected to multiplexer 14N. Each of the display controllers (e.g., 20A1, 20A4, 20N1 and 20N4) connects to a corresponding CRT display (e.g., 22A1, 22A4, 22N1 and 22N4, respectively). Each CRT display generates a visual image of the data that is entered at a corresponding one of the input terminals 10. Generally a single input terminal 10 is associated with a single display unit 22 to form an editing "station." One or more output units 24 are connected to the bus 16 to receive the edited text.

A supervisory station 28 comprises conventional units for connection to the bus 16, such as a memory unit 28A, an output unit in the form of a display 28B, and an input unit for operating as a control 28C. The supervisory station 28 monitors the operations at the various editing stations. For compatibility, each unit connected to the bus, including the multiplexers, has a control and status register (CSR) which stores control information required for communicating with the unit, as well as one or more data registers (DR) that "buffer" or temporarily store the data being transferred to or from the unit. The registers, and thus the units themselves, are directly addressable by all other units connected to the bus as though they were memory locations, and thus any data transfer with them is performed by normal memory reference instructions.

For purposes of illustration, the input terminals 10 may be considered to comprise conventional keyboards containing the usual alphabetic, numeric, and punctuation keys, as well as control keys which allow the editing of text which is to be displayed on the corresponding display units 22. The data from these input terminals 10 is applied to the bus 16, together with an address which designates the device to which the data is to be transferred and one or more control bits indicating whether a data reading or writing operation is to take place. The bus 16 is a bidirectional signal transfer device which allows a data transfer between any two devices connected directly to it, provided these devices have appropriate bus interface units incorporated in them. Such bus interface units are described in detail in the previously mentioned U.S. Pat. No. 3,710,324 and other related publications describing PDP11 data processing systems. For present purposes, it suffices to consider the bus as being comprised of a number of separate conductors which carry, respectively, device address signals, control signals, and data signals. These lines, or conductors, are preferably all organized for parallel data transfers and thus there is one line for each signal or digital bit position, in the address, data and control signals.

The central processor unit 12 performs the required editing in response to inputs from the keyboard. For example, in response to these inputs, it may add or delete characters, words, or lines provide a display of upper-case, lower-case, or italicized characters, and set up cursors to mark selected characters. In doing this, it communicates with the memories 18, as well as with the controllers 20, over the common bus. It also performs the usual "housekeeping" operations in the system, and may be available to perform functions wholly outside the text-editing and display system.

In a preferred embodiment, the central processor comprises a PDP11 general purpose digital computer. This includes a bus controller which, among other functions, monitors bus operations, assigns use of the bus to various devices connected to it in accordance with their assigned priority levels, and interrupts use of the bus by these devices when a device having a higher priority requests bus access as described in the previously mentioned U.S. Pat. No. 3,710,324.

The memory multiplexers 14 provide the connections between the common bus 16, on the one hand, and the memories 18 and display controllers 20 on the other, for purposes such as display data entry, editing, or storage, as the case may be, as well as between the memories 18 and visual display means that include the display units 22 and the display controllers 20 for refreshing the displays. They are involved in the two modes of transfer in the system. The first mode (between bus and memory or between bus and display controller) occupies the bus to the exclusion of units not involved in the data transfer, but generally takes little time in comparison with the second mode (between memory and display controller) which occurs independently of the bus. Thus, accessibility of the bus for use by the central processor unit 12 is dramatically expanded and the efficiency of processor operations is correspondingly increased. As a result, a significantly larger number of displays can be accommodated in the system.

The memories 18 comprise random access memories such as magnetic core memories. They are shared by the display controllers 20, as well as by the central processor unit 12 and other devices connected to the common bus, and are directly addressable through the multiplexer 14. The data stored in these memories can be operated on in place by the processor during editing operations.

The display controllers 20 organize the data for display. Among other functions they periodically retrieve refresh-display data from their associated memories 18 and assemble this data in the desired format for display. The controllers each include a character generator which is compatible with the characteristics of the displays 22. Knowledge of the details of the precise structure of the controllers is not necessary for understanding the present invention and, accordingly, they will not be described here in further detail. A more detailed understanding of its operation, however, may be attained by referring to the previously mentioned U.S. Patent Application Ser. No. 717,000.

It will be noted from FIG. 1 that each multiplexer has associated with it a single memory unit and several display units and their associated controller units, all of these elements constituting a display assembly for connection to the data processing system. The number of display units used in connection with each memory unit depends on the size of the display (i.e., the number of characters it can display at a given time) and the rate at which the display must be refreshed, as well as on the memory size. In the embodiment illustrated in FIG. 1, using a cathode ray tube (CRT) display unit capable of displaying up to 2,000 characters and requiring display refresh at a rate of sixty frames per second, an 8K (8192) word memory unit (using one word per character) readily accomodates four display units.

Figure 2:
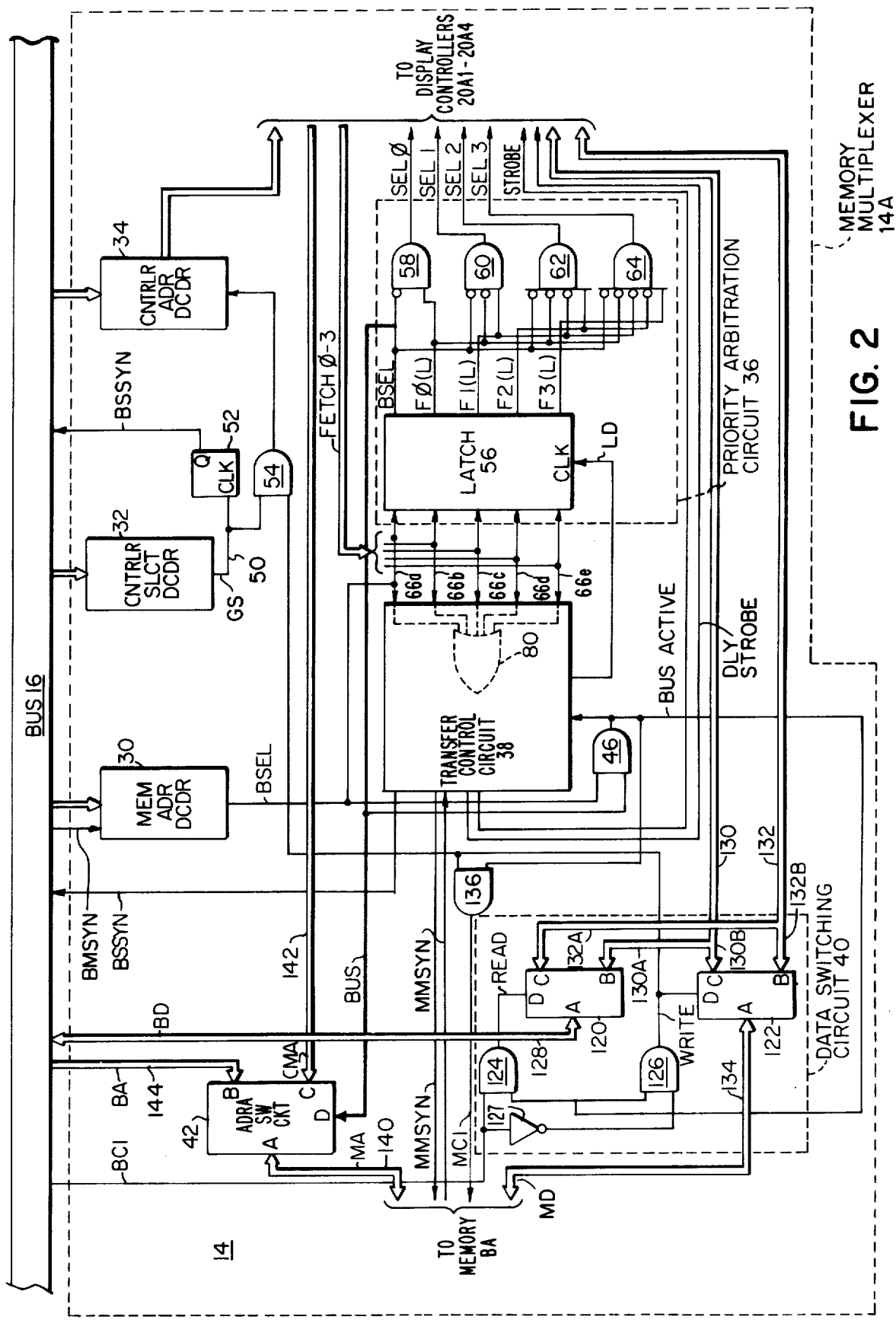
FIG. 2 is a block and line diagram of a memory multiplexer of FIG. 1.

FIG. 2 is a detailed block diagram of one of the memory multiplexers 14A; each memory multiplexer is constructed in a similar fashion. The multiplexer 14A includes a memory address decoder (MEM ADR DCDR) 30 which connects the memory associated with the multiplexer to the common bus 16 when the memory is addressed by the central processor unit 12; a controller select decoder (CNTR SLCT DCDR) 32 which selects a display controller connected to the memory multiplexer 14A to receive data from bus 16; a controller address decoder (CNTRLR ADR DCDR) 34 which connects one of the display controllers to the common bus when the controller is addressed by the central processor unit 12; a priority arbitration circuit 36 which receives requests from the bus 16 and from the display controllers for data transfers to or from any of these or to or from memory and selects one of these units in accordance with a predetermined priority scheme; a transfer control circuit 38 which generates the signals which control the transfer of data between a memory 18 and the common bus 16 or the display controllers 20; a data switching circuit 40 which establishes the data transfer paths between the common bus 16, a memory 18 and selected display controller 20; and an address switching circuit 42 which couples the address lines of either common bus 16 or selected display controllers 20 to a memory 18.

The memory address decoder 30 is connected to receive from the address conductors in the bus 16 address signals designating a location in one of memories 18 as the location to be connected to the bus 16 and a bus master synchroning (BMSYN) signal designating the initiation of a data transfer operation by a master device on the bus 16, such as the central processor unit 12. In response, the memory address decoder 30 in a memory multiplexer 14 generates a bus selection (BSEL) signal if the address signals designate a location in the associated memory 18 which it applies to the priority arbitration circuit 36 to set up a connection between the associated memory 18 and the bus 16 when the priority level of this signal is reached. The BSEL signal also is coupled to the transfer control circuit 38 through AND gate 46. The transfer control circuit 38 responds to the BSEL signal by initiating a transfer with the memory and then generating a bus a slave synchronizing (BSSYN) signal to the common bus 16, to indicate the completion of memory transfer operation. The transfer control circuit 38 also generates a memory master synchronizing signal (MMSYN) signal to initiate operations in the associated memory.

On the other hand, if an associated display controller is constructed as shown in U.S. Pat. No. 4,057,849 and the address signal controller select decoder 32 generates a group select (GS) signal on a lead 50 which sets a latch 52 thereby to apply to the bus 16 a bus slave synchronizing signal that acknowledges the completion of a data transfer operation with the designated location. The group select signal is also applied to an AND gate 54 together with a WRITE signal derived from the bus 16. The output of gate 54 enables the controller address decoder 34 to select a particular location within the display controller connected to the memory for multiplexer 14 for accepting data from the bus 16.

Priority arbitration circuit 36 includes a multiple input latch 56 and a number of gates 58–64 having a single non-inverting input and one or more inverting inputs connected to receive selected outputs of the latch for generating the priority selection signals. Latch 56 has a number of input lines 66a-e which receive, respectively, the BSEL signal from the memory address decoder 30 and four FETCH signals (FETCH φ–3) from the respective display controllers; the FETCH signals are the requests of the corresponding display controllers for initiating a data transfer from the memory 14 to the corresponding CRT display 22. A clock (CLK) input to the latch 56 from the transfer control circuit 38 enters FETCH signals on the output lines; thee signals then appear on latch output lines until receipt of the next clock signal.

The BUS output signal from the priority arbitration circuit 36 is equivalent to a latched bus selection (BSEL) signal generated whenever the BSEL signal is clocked into the latch 56. In other words, the BSEL signal is granted the highest priority. The SEL $\phi$–3 signals are formed at the outputs of gates 58, 60, 62 and 64 from the latched FETCH $\phi$–3 inputs, F0(L)–F3(L), respectively (the letter "L" designates a ground assertion signal). This is accomplished by applying the F0(L)–F3(L) outputs to the non-inverting inputs of gates 58, 60, 62 and 64, respectively and by applying the respective outputs to the inverting inputs of each gate of higher number than its own. For example, F1(L) is applied to the non-inverting input of gate 60, as well as to the inverting input of gates 60, 62 and 64. The latched BSEL signal from the latch 56 (i.e., the Bus signal) is also applied as an inverting input to all the gates.

The priority arbitration circuit 36 thereby establishes an order of priority for data transfers in which a transfer requested by the bus 16 has a highest priority and the FETCH $\phi$–3 requests have successively lower priorities. The BUS signal is gated with the BSEL signal by AND gate 46 whose output is a BUS ACTIVE signal that is applied to transfer control circuit 38 along with the BUS signal to disable data transfers to the controller during the time the memory is connected to the bus. The BUS ACTIVE signal also is applied to data switching circuit 40 to establish the data path for transferring data between the bus 16 and the memory 18. The SEL $\phi$–3 signals are applied to the respective display controllers to enable a data transfer from a memory 18 to the selected display controller 20.

Referring now to FIG. 3, the transfer control gate 38 includes an OR circuit 80 which receives the requests for access to memory either from the bus 16, represented by the BSEL signal, or from the display controllers, represented by one of the FETCH signals. The output of the OR gate 80 is applied through a gate 82, a delay unit 84, and an OR gate 86 to the clocking input of a bistable element in the form of a D-type flip-flop 88. More Specifically, when the flip-flop 88 is cleared, the gate 82 is enabled to pass the signal from the OR gate 80 to its clocking input via delay circuit 84 and an OR gate 86. This signal sets flip-flop 88 and thus disables gate 82. When the flip-flop 88 is set, it generates a memory master synchronizing (MMSYN) signal that triggers a memory operation. When the memory operation has been completed, the memory transmits a memory slave synchronizing (MSSYN) singal to the control circuit 38. The MMSYN and MSSYN signals energize an AND gate 92 to enable AND gates 94 and 96. It will be recalled that the BUS signal is the latched version of the BSEL signal and that the BUS ACTIVE signal represents the coincidence of the two. Thus, if the initiating signal applied to gate 80 is a BSEL signal while the BUS signal is not asserted, a gate 90 is energized to clear the flip-flop 88 thereby to enable the gate 82. In addition, gate 94 will be energized by the BUS ACTIVE signal and gate 96 disabled by the assertion of the BUS SIGNAL, so the control circuit 38 generates a bus slave synchronizing (BSSYN) signal which it applies to the common bus 16. If, on the other hand, the initiating signal at the OR gate 80 is one of the four FETCH signals the gate 94 is disabled, but the gate 96 is energized. The output of gate 92 is thus applied through gate 96 to delays 98 and 100 to generate the STROBE and DLY STROBE signals, respectively. The DLY STROBE signal also is applied through circuit 86 to reset flip-flop 88. When the flip-flop 88 is reset, it enables the gate 82 to respond to the next memory access request.

Returning now to FIG. 2, the data switching circuit 40 comprises first and second bus switching elements 120 and 122, and corresponding AND gates 124 and 126, respectively. The switching elements 120 and 122 are solid state switches, each having data switching terminals A, B and C, and a control input terminal D. In response to control signals applied to their control input terminals from AND gates 124 and 126, respectively, they connect a set of data lines applied to terminal A of the switch to either of two other terminals B or C of the switch. In this respect, their function is similar to that of a number of ganged single pole, double-throw switches.

Specifically, the switching element 120 connects a set of data lines 128 applied to terminal 120A from the bus 16 to a corresponding set of data lines 130A connected to terminal 120B when the output of gate 124 is present, and connects the lines at terminal 120A to a set of data lines 132A connected to terminal 120C when the output of AND gate 124 is not present. Similarly, the switching element 122 receives a set of data lines 134 from the memory 18 at terminal 122A and connects these to a corresponding set of data lines 132B at terminal 122B when the output of AND gate 126 is present, and to a set of data lines 130B at terminal 122C when the output of AND gate 126 is not present. The data lines 130A and 130B are common with each other, as are the data lines 132A and 132B; further, they also are bidirectional, that is can carry data in either direction. Data lines 130A and 130B join to data lines 130 which carry data to the display controllers; similarly, data lines 132A and 132B join to data lines 132 which likewise carry data to the controllers. Data lines 130 carry data to certain initialization registers (margin width and scroll address registers) in the controllers, while data lines 132 carry data from memory 18 to display line registers in the controllers; the data on these lines is entered in the controller only in response to specific LOAD commands. This is described in detail in my copending application referred to above.

The AND gates 124 and 126 respond to the output of gate 46 and the BC1 signal from the bus 16 when data is to be retrieved from the memory through the memory multiplexer and transmitted onto the bus (i.e., a reading operation), the AND gate 124 generates a READ signal. When a writing operation is to occur, the AND gate 126 generates a WRITE signal. The selection is controlled by a BC1 signal that is asserted to indicate a reading operation. In the absence of a BUS ACTIVE output signal from gate 46, the AND gates 124 and 126 both are disabled and bus data lines 128 are thus connected to data lines 132A at terminal 120C, while memory data lines 134 are connected to data lines 130B at terminal 122C. This establishes data transfer paths between the display controllers and the bus via data lines 128 and 130, as well as between the display controllers and the memory 18 via data lines 134 and 132.

When the BUS ACTIVE signal is present at the output of AND gate 46, AND gates 124, 126 and 136 respond to the BC1 signal from the bus 16 and the WRITE signal from the gate 126. In the absence of a READ signal on bus 16, switching element 122 connects memory data lines 134 to controller data lines 132B, while switching element 120 connects bus data lines 128 to controller data lines 132A. This provides bus access to memory for writing operations. The WRITE output of gate 126 and the BUS ACTIVE signal energize the gate 136 to thereby condition the memory for writing in response to the output (MCI) of gate 136.

Conversely, when a READ signal is present on bus 16, switching element 120 connects bus data lines 128 to controller data lines 130A while switching element 122 connects memory data lines 134 to controller data lines 130B. This provides bus access to memory for reading operations during which data is transferred to the bus 16 from the memory.

An address switching circuit (ADRA SW CKT) 42 comprises a solid state analog of a mulit-pole double throw switch. It connects memory address lines 140 at terminal A to either controller memory address (CMA) lines 142 at terminal B or to bus address (BA) lines 144 at terminal C dependent on the status of a control signal applied to terminal D. In the absence of a BUS signal at terminal D, switching circuit 42 connects memory address lines 140 to display controller address lines 142; thus, the controller addresses memory with the current memory address (CMA) of a character which is to be retrieved for display. However, when a BUS signal is present at terminal D, the switching circuit 42 connects the memory address lines 140 to the bus address lines 144 to thereby provide bus access to memory for a reading or writing operation.

The operation of the memory multiplexer during data transfers within the system will now be described for each mode of data transfer.

Data Transfer to or from the Common Bus 16

Data is transferred either between the common bus 16 and the memory 18 or between the display controller 20 and the memory 18.

First, consider a request by the central processor unit 12 for access to memory. Specifically, consider a READ request. To initiate the data transfer from memory, the central processor unit 12 generates a bus master synchronizing signal and the address of the selected memory unit onto the bus 16. The multiplexer 14 associated with the address memory responds by generating a MMSYN signal. In addition, the address switching circuit 42 of multiplexer 14 connects the address lines of bus 16 to the memory address terminals and the data switching circuit 40 applies the bus data lines to the data terminals of memory unit 18.

The multiplexer 14 also responds to signals on the bus 16 by applying an MC1 signal to the memory unit 18. Thus, the data and address paths are now established to enable a data transfer from memory unit 18 to the processor over the bus. The cycle is completed when the memory transmits the MSSYN signal thereby to enable the multiplexer to generate the BSSYN signal.

The processor 12 also transfers data to the display controllers associated with a multiplexer 14. To initiate this transfer, the central processor unit 12 generates the bus master synchronizing (BMSYN) signal and the address of the selected multiplexer onto bus 16. Decoder 32 in multiplexer 14 responds to these signals and returns the BSSYN signal to the central processor unit 12. It also enables the decoder 34 so that the display controller 20 can receive data from bus 16. Concurrently, data switching circuit 40 connects the data lines of bus 16 to the display controller data inputs so the central processor unit 12 can transfer data into the selected display controller.

Refresh Display Data Transfers

To initiate a display refresh transfer from memory, the display controller 20 generates a FETCH signal which is received by the multiplexer 14. In response, the multiplexer 14 transmits an MMSYN signal to memory and returns a SELECT signal to the highest priority display controller requesting data. The memory unit 18 transfers data from a location defined by the controller memory address, or CMA signals from the display controller which are conveyed to the memory unit 18 via the switching circuit 42. The data retrieved from memory is then entered into the controller data registers on transmission of the STROBE signal to the controllers from the multiplexer in response to the receipt of the MSSYN signal from the memory.

Conclusion

From the foregoing it will be seen that I have provided an improved text editing and display system. The system removes the time-consuming display-refresh data transfers from the common bus, while retaining rapid access between the various memory units in the system; this is accomplished with little or no involvement of the central processor unit.

It will be clear to those skilled in the art that various changes may be made from the foregoing without departing from either the spirit or the scope of the invention and it is intended that such changes be encompassed herein, the scope of the invention being defined with particularity in the attached claims.

I claim:

1. An electronic text-editing system comprising:
   A. editing means including a central processor unit for performing text-editing functions,
   B. a plurality of editing stations each having an input terminals for entering text to be edited into said editing means and for entering editing commands that control the editing functions performed by said editing means,
   C. a common bus interconnecting said editing means and said plurality of input terminals, said common bus including data signal, address signal and transfer control signal conductors, and
   D. a plurality of display assemblies connected to said common bus, each said display assembly comprising:
      i. a memory for storing data representing text to be edited, said memory having address signal, data signal and transfer control conductors and including a plurality of addressable storage locations, each said storage location being identified by a unique set of address signals on said common bus address signal conductors,
      ii. a plurality of visual display means, each visual display means having address signal, data signal and transfer control signal conductors and each said visual display means constituting an output terminal and being connected for operation with a said display device of said editing station at which text entered at said input terminal is routed by said editing means from said input terminal over said common bus to said memory for a visual presentation by said visual display device, and
      iii. multiplexing means connected to said common bus, said memory and each said visual display, means, said multiplexing means including:

a. controllable data switching means interconnecting all of said data signal conductors for routing data signals between said common bus and said memory and between said visual display means and said memory,
b. controllable address switching means interconnecting all of said address signal conductors for routing address signals from said common bus to said memory and from said visual display means to said memory, and
c. transfer control means connected to said controllable data switching means and said controllable address switching means for interconnecting all said transfer control signal conductors, said transfer control means including means responsive to said transfer control signals for generating a switching control signal that controls the routing of address and data signals by said controllable address switching means and said controllable data switching means, respectively.

2. An electronic text-editing system as recited in claim 1 wherein each said multiplexing means further includes:
d. memory address decoder means connected to said common bus address signal conductors and said transfer control means for generating a bus selection signal in response to address signals from said common bus that correspond to an address for said memory, and
e. display address decoder means connected to said address signal conductors for said visual display means and said common bus for establishing a data transfer path between each said visual display means and said common bus in response to address signals from said common bus that designate said visual display means.

3. An electronic text-editing system as recited in claim 2 wherein the switching control signal assumes first and second states and said controllable data switching means comprises:
i. first connection means connected to said common bus data signal conductors,
ii. second connection means connected to said memory data signal conductors,
iii. third connection means connected to said visual display means data signal conductors, and
iv. a controllable switching circuit connected to said first, second and third connection means and responsive to a first state of the switching control signal for interconnecting said first and second connection means and to the second state of the switching control signal for interconnecting said second and third connection means.

4. An electronic text-editing system as recited in claim 2 wherein each said multiplexing means includes priority arbitration means connected to the transfer control conductors of said common bus and of said visual display means for selecting said common bus or one of said visual display means for operation during a transfer of data signals with said memory.

5. An electronic text-editing system as recited in claim 2 wherein said memory responds to address signals corresponding to said memory and a first transfer control signal for producing a data transfer over said data signal conductor and for generating a second transfer control signal and wherein said transfer control means includes:
i. a bistable element characterized by having set and cleared states;
ii. means connected to said transfer control signal conductors of said common bus and said visual display means, for changing the state of said bistable element,
iii. a first gate connected to said bistable element and said memory, said first gate being energized when said bistable element assumes the set condition and said memory generates the second transfer control signal,
iv. a second gate connected to said first gate and to said transfer control means, said second gate being energized when said first gate is energized and the switching control signal is active for transmitting to said common bus another transfer control signal acknowledging the completion of a data transfer, and
v. a third gate connected to said first gate and said transfer control means, said third gate being enabled by said first gate in response to a transfer control signal from a said visual display means for generating a signal indicating the availability of data on said memory data signal conductors and for causing said visual display means to transfer the data thereto.

* * * * *